US012571400B2

(12) United States Patent
Ginsberg et al.

(10) Patent No.: US 12,571,400 B2
(45) Date of Patent: Mar. 10, 2026

(54) VARIABLE FREQUENCY DRIVE (VFD) SURGE DETECTION AND RESPONSE

(71) Applicant: Carrier Corporation, Palm Beach Gardens, FL (US)

(72) Inventors: David Ginsberg, Granby, CT (US); Ismail Agirman, Southington, CT (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 186 days.

(21) Appl. No.: 18/082,954

(22) Filed: Dec. 16, 2022

(65) Prior Publication Data

US 2023/0193914 A1 Jun. 22, 2023

Related U.S. Application Data

(60) Provisional application No. 63/290,992, filed on Dec. 17, 2021.

(51) Int. Cl.
*F04D 27/00* (2006.01)
*F04D 27/02* (2006.01)
*F25B 31/02* (2006.01)

(52) U.S. Cl.
CPC ....... *F04D 27/001* (2013.01); *F04D 27/0261* (2013.01); *F25B 31/02* (2013.01); *F05D 2260/83* (2013.01); *F25B 2600/025* (2013.01)

(58) Field of Classification Search
CPC ............... F04D 27/001; F04D 27/0261; F05D 2260/83; F25B 31/02; F25B 2600/025
See application file for complete search history.

(56) References Cited

U.S. PATENT DOCUMENTS

| | | | |
|---|---|---|---|
| 4,546,618 | A | 10/1985 | Kountz et al. |
| 4,608,833 | A | 9/1986 | Kountz |
| 5,355,691 | A | 10/1994 | Sullivan et al. |
| 6,206,652 | B1 | 3/2001 | Caillat |

(Continued)

FOREIGN PATENT DOCUMENTS

| | | | |
|---|---|---|---|
| CN | 112879317 | A | 6/2021 |
| GB | 2060210 | A | 4/1981 |

(Continued)

OTHER PUBLICATIONS

Search Report issued in European Patent Application No. 22214753.0; Application Filing Date Dec. 19, 2022; Date of Mailing Apr. 21, 2023 (6 pages).

(Continued)

*Primary Examiner* — Henry T Crenshaw
(74) *Attorney, Agent, or Firm* — CANTOR COLBURN LLP

(57) ABSTRACT

A chiller system is provided and includes a compressor, a variable frequency drive (VFD) to drive the compressor at variable frequencies and a chiller controller to ascertain a chiller condition and to command the VFD to drive the compressor at one of the variable frequencies based on the chiller condition at a first sampling rate. The VFD is configured to drive the compressor at the one of the variable frequencies responsive to being commanded by the chiller controller, to ascertain the chiller condition at a second sampling rate, which is substantially higher than the first sampling rate, and to alert the chiller controller accordingly.

20 Claims, 4 Drawing Sheets

(56) References Cited

U.S. PATENT DOCUMENTS

| | | | |
|---|---|---|---|
| 7,412,841 | B2 | 8/2008 | Ueda et al. |
| 8,209,057 | B2 | 6/2012 | Judge et al. |
| 8,726,678 | B2 | 5/2014 | Turney et al. |
| 8,727,736 | B2 | 5/2014 | Walth |
| 9,702,365 | B2 | 7/2017 | Rosinski et al. |
| 10,280,928 | B2 | 5/2019 | Hossain et al. |
| 10,330,106 | B2 | 6/2019 | Hossain et al. |
| 10,612,827 | B2 | 4/2020 | Sibik |
| 10,634,405 | B2 | 4/2020 | Sibik |
| 10,989,210 | B2 | 4/2021 | Swindlehurst et al. |
| 2012/0100011 | A1 * | 4/2012 | Sommer ............. F04D 27/0246 417/44.1 |
| 2021/0215161 | A1 | 7/2021 | Wang et al. |

FOREIGN PATENT DOCUMENTS

| | | | |
|---|---|---|---|
| JP | 2006-275492 | * | 10/2006 |
| JP | 2006275492 | A | 10/2006 |
| WO | 2009055878 | A2 | 5/2009 |
| WO | WO-2009-055878 | * | 7/2009 |
| WO | 2012131709 | A1 | 10/2012 |

OTHER PUBLICATIONS

European Office Action for EP 22214753 issued Jun. 12, 2025, 24 pages.

* cited by examiner

VARIABLE FREQUENCY DRIVE (VFD) SURGE DETECTION AND RESPONSE

CROSS-REFERENCE TO RELATED APPLICATIONS

This application claims priority to U.S. Provisional Application Ser. No. 63/290,992, filed Dec. 17, 2021, the contents of which are hereby incorporated by reference in its entirety.

BACKGROUND

The following description relates to chillers and, more specifically, to a chiller system with variable frequency drive (VFD) surge detection and response.

A chiller is a machine that removes heat from liquid coolant via a vapor-compression, adsorption-refrigeration or absorption-refrigeration cycles. This liquid can then be circulated through a heat exchanger to cool equipment, or another process stream (such as air or process water). In air conditioning systems, chilled coolant, usually chilled water mixed with ethylene glycol, from a chiller in an air conditioning or cooling plant is typically distributed to heat exchangers or coils in air handlers or other types of terminal devices which cool the air in their respective space(s). The water is then recirculated to the chiller to be re-cooled.

For air conditioning systems, such as a heating, ventilation and air-conditioning (HVAC) system, it has been found that improved system efficiency can be achieved by operating a compressor near the compressor surge point. However, since the chiller controller in such a system, which typically controls chiller operations, normally operates at a frequency of about 1 Hz, the chiller controller may not be able to detect and respond quickly enough to prevent surge events when operating the compressor very near the surge point. As a result, it is often the case that the compressor is not operated near the surge point so as to avoid risking an occurrence of a surge event. This lowers an overall system efficiency.

BRIEF DESCRIPTION

According to an aspect of the disclosure, a chiller system is provided and includes a compressor, a variable frequency drive (VFD) to drive the compressor at variable frequencies and a chiller controller to ascertain a chiller condition and to command the VFD to drive the compressor at one of the variable frequencies based on the chiller condition at a first sampling rate. The VFD is configured to drive the compressor at the one of the variable frequencies responsive to being commanded by the chiller controller, to ascertain the chiller condition at a second sampling rate, which is substantially higher than the first sampling rate, and to alert the chiller controller accordingly.

In accordance with additional or alternative embodiments, the first sampling rate is about ~1 Hz and the second sampling rate is about ~1 to ~10 KHz.

In accordance with additional or alternative embodiments, a compressor motor of the compressor and mechanical components are separate and distinct from the compressor motor, and the chiller controller is disposed in signal communication with the VFD and the mechanical components at the first sampling rate and is configured to ascertain the chiller condition from communications with the mechanical components.

In accordance with additional or alternative embodiments, the VFD is configured to ascertain the chiller condition by monitoring compressor motor current at the second sampling rate.

In accordance with additional or alternative embodiments, the chiller controller commands the VFD to drive a motor of the compressor at one of the variable frequencies to counteract the chiller condition responsive to being alerted by the VFD.

In accordance with additional or alternative embodiments, the chiller condition is indicative of a surge condition and the chiller controller commands the VFD to drive the motor of the compressor at an increased speed to counteract the surge condition.

According to an aspect of the disclosure, a chiller system is provided and includes a compressor, a variable frequency drive (VFD) to drive the compressor at variable frequencies and a chiller controller to ascertain a chiller condition and to command the VFD to drive the compressor at one of the variable frequencies based on the chiller condition at a first sampling rate. The VFD is configured to drive the compressor at the one of the variable frequencies responsive to being commanded by the chiller controller, to ascertain the chiller condition at a second sampling rate, which is substantially higher than the first sampling rate, and to initiate an override mode accordingly during which the VFD generates an internal command to drive the compressor at one of the variable frequencies based on the chiller condition at the second sampling rate and drives the compressor at the one of the variable frequencies responsive to the internal command.

In accordance with additional or alternative embodiments, the first sampling rate is about ~1 Hz and the second sampling rate is about ~1 to ~10 KHz.

In accordance with additional or alternative embodiments, a compressor motor of the compressor and mechanical components are separate and distinct from the compressor motor, and the chiller controller is disposed in signal communication with the VFD and the mechanical components at the first sampling rate and is configured to ascertain the chiller condition from communications with the mechanical components.

In accordance with additional or alternative embodiments, the VFD is configured to ascertain the chiller condition by monitoring compressor motor current at the second sampling rate.

In accordance with additional or alternative embodiments, the internal command commands the VFD to drive a motor of the compressor at one of the variable frequencies to counteract the chiller condition.

In accordance with additional or alternative embodiments, the chiller condition is indicative of a surge condition and the internal command commands the VFD to drive the motor of the compressor at an increased speed to counteract the surge condition.

In accordance with additional or alternative embodiments, the VFD alerts the chiller controller as to the override mode being initiated and the chiller controller is configured to revoke the override mode.

In accordance with additional or alternative embodiments, the VFD alerts the chiller controller as to the override mode being initiated and the chiller controller is configured to adjust operating conditions to counteract the chiller condition.

According to an aspect of the disclosure, a method of operating a variable frequency drive (VFD) of a chiller system in which a chiller controller ascertains a chiller condition and commands the VFD to drive a compressor at one of variable frequencies based on the chiller condition at a first sampling rate is provided. The method is executable by the VFD and includes driving the compressor at the one of the variable frequencies responsive to being commanded by the chiller controller, ascertaining the chiller condition at a second sampling rate, which is substantially higher than the first sampling rate and initiating an override mode accordingly during which the VFD generates an internal command to drive the compressor at one of the variable frequencies based on the chiller condition at the second sampling rate and drives the compressor at the one of the variable frequencies responsive to the internal command.

In accordance with additional or alternative embodiments, the first sampling rate is about ~1 Hz and the second sampling rate is about ~1 to ~10 KHz.

In accordance with additional or alternative embodiments, the ascertaining of the chiller condition includes monitoring compressor motor current at the second sampling rate.

In accordance with additional or alternative embodiments, the chiller condition is indicative of a surge condition and the internal command commands the VFD to drive a motor of the compressor at an increased speed to counteract the surge condition.

In accordance with additional or alternative embodiments, the VFD alerts the chiller controller as to the override mode being initiated and the chiller controller is configured to revoke the override mode.

In accordance with additional or alternative embodiments, the VFD alerts the chiller controller as to the override mode being initiated and the chiller controller is configured to adjust operating conditions to counteract the chiller condition.

These and other advantages and features will become more apparent from the following description taken in conjunction with the drawings.

BRIEF DESCRIPTION OF THE DRAWINGS

The subject matter, which is regarded as the disclosure, is particularly pointed out and distinctly claimed in the claims at the conclusion of the specification. The foregoing and other features and advantages of the disclosure are apparent from the following detailed description taken in conjunction with the accompanying drawings in which:

These and other advantages and features will become more apparent from the following description taken in conjunction with the drawings.

DETAILED DESCRIPTION

As will be described below, an air conditioning system is provided in which a compressor can be operated near a compressor surge point so as to improve system efficiency without risking the compressor being operated in a surge condition. This is made possible by the presence of a variable frequency drive (VFD) in the air conditioning system for driving the compressor and making use of relatively high-frequency control loops within the VFD (i.e., about ~1 kHz for the VFD vs. about ~1 Hz for the chiller controller) to detect and react to a surge condition. That is, the VFD identifies a surge condition by monitoring compressor motor currents at a relatively high-frequency of about ~1 kHz. The VFD reacts to the surge condition by increasing an operational speed of the compressor to prevent the compressor from operating in a surge condition. The VFD can then set a flag to indicate a surge is active, and can send that flag it to a system controller which can in turn adjust operating conditions away from surge.

Figure 1:
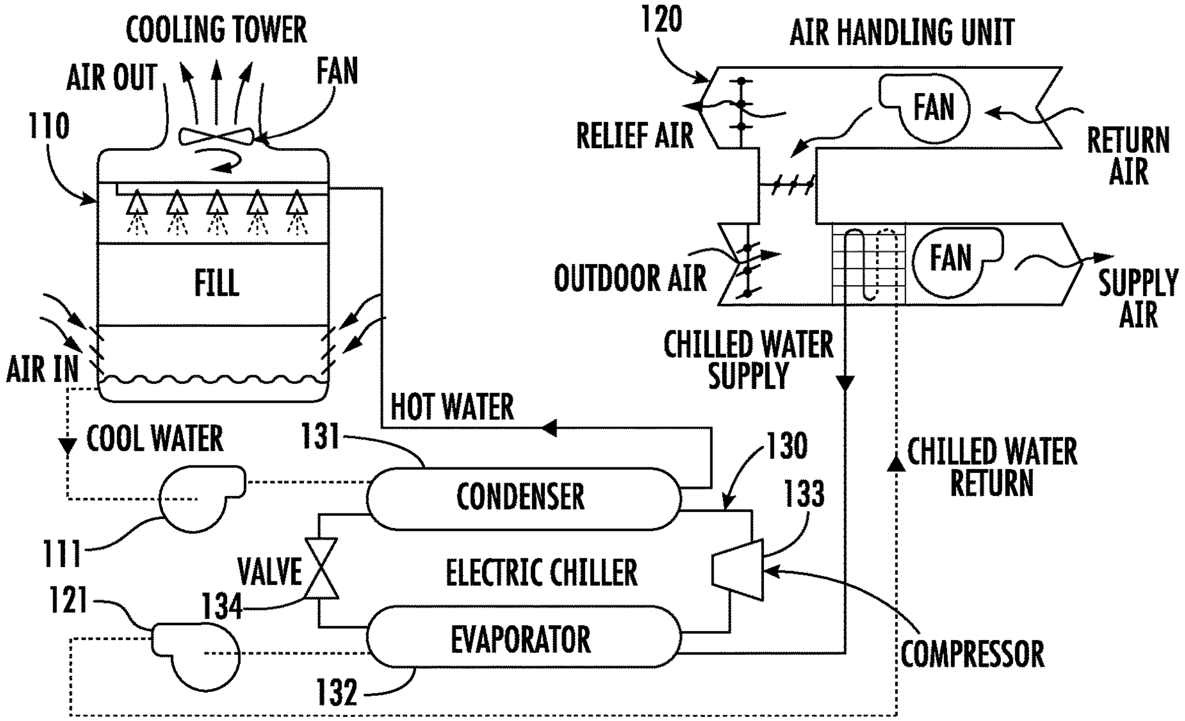
FIG. 1 is a schematic diagram of an exemplary air conditioning system including an electric chiller in accordance with embodiments.

With reference to FIG. 1, an exemplary air conditioning system 101 is provided and includes a cooling tower 110, an air handling unit 120, and an electric chiller 130. Hot water from a condenser 131 of the electric chiller 130 enters the cooling tower 110 where it is cooled. The cooled water is then pumped from the cooling tower 110 back to the condenser 131 by a pump 111. Meanwhile, cooled water is pumped to the air handling unit 120 out of an evaporator 132 of the electric chiller 130 by a pump 121. The cooled water is heated in the air handling unit 120 and returns as hot water to the evaporator 132. The electric chiller 130 includes the condenser 131, the evaporator 132, a compressor 133, and an expansion valve 134. The compressor 133 compresses vaporized refrigerant received from the evaporator 132 and outputs the compressed refrigerant vapor to the condenser 131. Within the condenser 131, the compressed refrigerant vapor gives up heat to generate the heated water for the cooling tower 110 and thus condenses into liquid. The liquid is then sent to the expansion valve 134 in which the liquid becomes a liquid and vapor mixture that is sent to the evaporator 132. Within the evaporator 132 the remaining liquid removes heat from the hot water returning from the air handling unit 120 and is thus vaporized.

With continued reference to FIG. 1 and with additional reference to FIG. 2, the compressor 133 of the electric chiller 130 of FIG. 1 can include a compressor motor 201 and the electric chiller 130 can further include various and multiple mechanical components (hereinafter referred to as "mechanical components") 202 that are separate and distinct from the compressor motor 201. The mechanical components 202 can include a multitude of actuators and sensors that are deployed throughout the electric chiller 130 in the condenser 131, the evaporator 132, the compressor 133 and the expansion valve 134 to control and monitor operations of the electric chiller 130.

Figure 2:
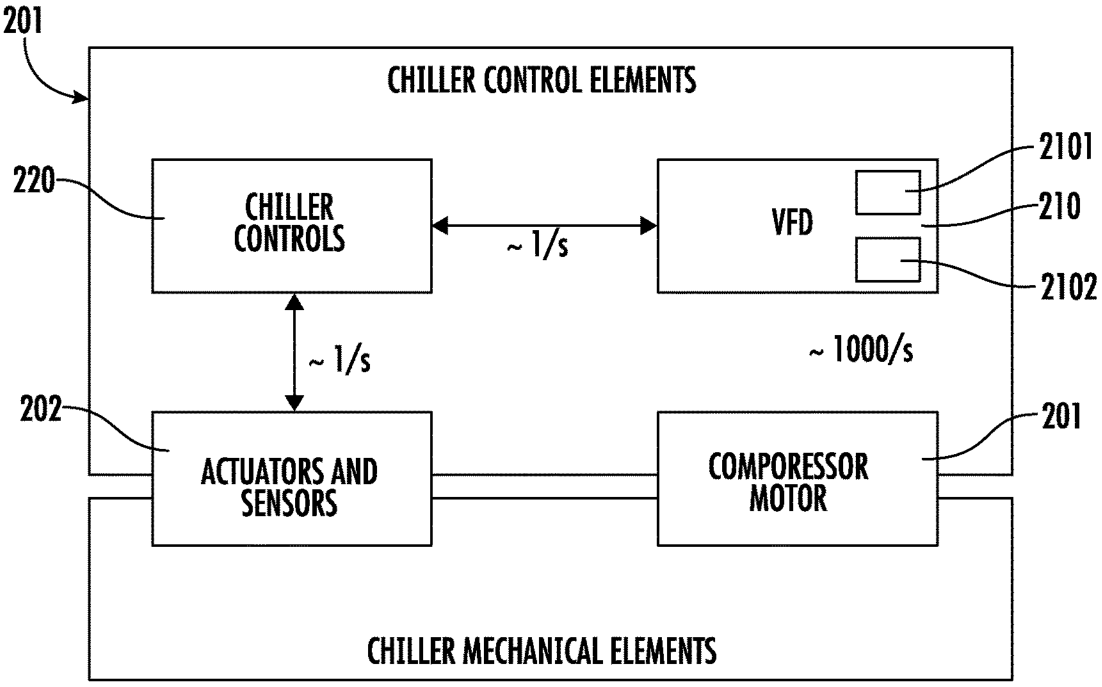
FIG. 2 is a schematic diagram of an exemplary chiller control scheme for use with the electric chiller of FIG. 1 in accordance with embodiments.

As shown in FIG. 2, an exemplary chiller control scheme 200 is provided to control various operations of the electric chiller 130 of FIG. 1.

In accordance with embodiments, the chiller control scheme 200 includes at least the compressor motor 201 of the compressor 133 of FIG. 1, a VFD 210 to drive the compressor motor 201 at variable frequencies and speeds, and a chiller controller 220. The chiller controller 220 is disposed in signal communication with the VFD 210 and with the mechanical components 202 at a first sampling rate (e.g., about ~1 Hz). The chiller controller 220 is configured to ascertain a chiller condition from communications with the mechanical components 202 and to command the VFD 210 to drive the compressor motor 201 at one of the variable frequencies based on the chiller condition at a first sampling rate (e.g., about ~1 Hz). The VFD 210 is configured to drive the compressor motor 201 at the one of the variable frequencies responsive to being commanded to do so by the chiller controller 220. The VFD 210 is also configured to ascertain the chiller condition at a second sampling rate (e.g., between ~1 to ~10 kHz), which is substantially higher than the first sampling rate, by monitoring compressor motor current of the compressor motor 201 at the second sampling rate and to alert the chiller controller 220 accordingly or as to a nature of the chiller condition and/or whether the chiller condition is in effect. With the chiller controller 220 having been alerted to the chiller condition by the VFD 210, the chiller controller 220 can respond by commanding the VFD 210 to drive the compressor motor 201 at one of the variable frequencies to counteract the chiller condition.

In accordance with embodiments, the chiller condition can be a surge condition or a condition that is otherwise indicative of a surge condition. In these or other cases, the chiller controller 220 can command the VFD 210 to drive the compressor motor 201 at an increased speed to counteract the surge condition.

Figure 3:
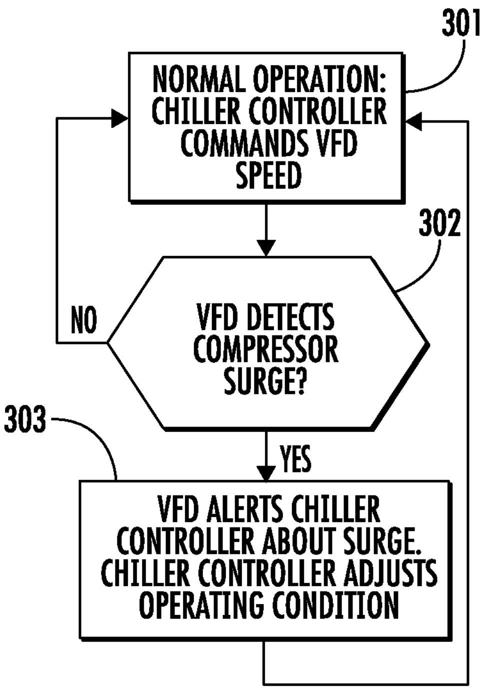
FIG. 3 is a flow diagram illustrating an exemplary operation of the chiller control scheme of FIG. 2 in accordance with embodiments.

With reference to FIG. 3, the operations described above are illustrated. Initially, during normal operations, the chiller controller 220 commands VFD 210 speed (block 301). At a certain point, the VFD 210 detects a compressor surge condition (block 302) or control reverts back to block 301. Since the VFD 210 detection capability is at the second sampling rate, which is substantially faster than the first sampling rate of the chiller controller 220, the detection by the VFD 210 can be significantly earlier relative to a beginning of the compressor surge condition than any detection by the chiller controller 220. Subsequently, the VFD 210 alerts the chiller controller 220 to the compressor surge condition whereupon the chiller controller 220 can adjust operating conditions (block 303).

With reference back to FIG. 2 and in accordance with further embodiments, the chiller control scheme 200 includes at least the compressor motor 201 of the compressor 133 of FIG. 1, a VFD 210 to drive the compressor motor 201 at variable frequencies and speeds and a chiller controller 220. The chiller controller 220 is disposed in signal communication with the VFD 210 and with the mechanical components 202 at a first sampling rate (e.g., about ~1 Hz). The chiller controller 220 is configured to ascertain a chiller condition from communications with the mechanical components 202 and to command the VFD 210 to drive the compressor motor 201 at one of the variable frequencies based on the chiller condition at a first sampling rate (e.g., about ~1 Hz). The VFD 210 is configured to drive the compressor motor 201 at the one of the variable frequencies responsive to being commanded to do so by the chiller controller 220. The VFD 210 is also configured to ascertain the chiller condition at a second sampling rate (e.g., between ~1 to ~10 kHz), which is substantially higher than the first sampling rate, by monitoring compressor motor current of the compressor motor 201 at the second sampling rate and to initiate an override mode accordingly. During this override mode, the VFD 210 generates an internal command to drive the compressor motor 201 at one of the variable frequencies based on the chiller condition at the second sampling rate and thus drives the compressor motor 201 at the one of the variable frequencies responsive to the internal command.

As described above, in accordance with embodiments, the chiller condition can be a surge condition or a condition that is otherwise indicative of a surge condition. In these or other cases, the internal command can command the VFD 210 to drive the compressor motor 201 at an increased speed to counteract the surge condition.

Figure 4:
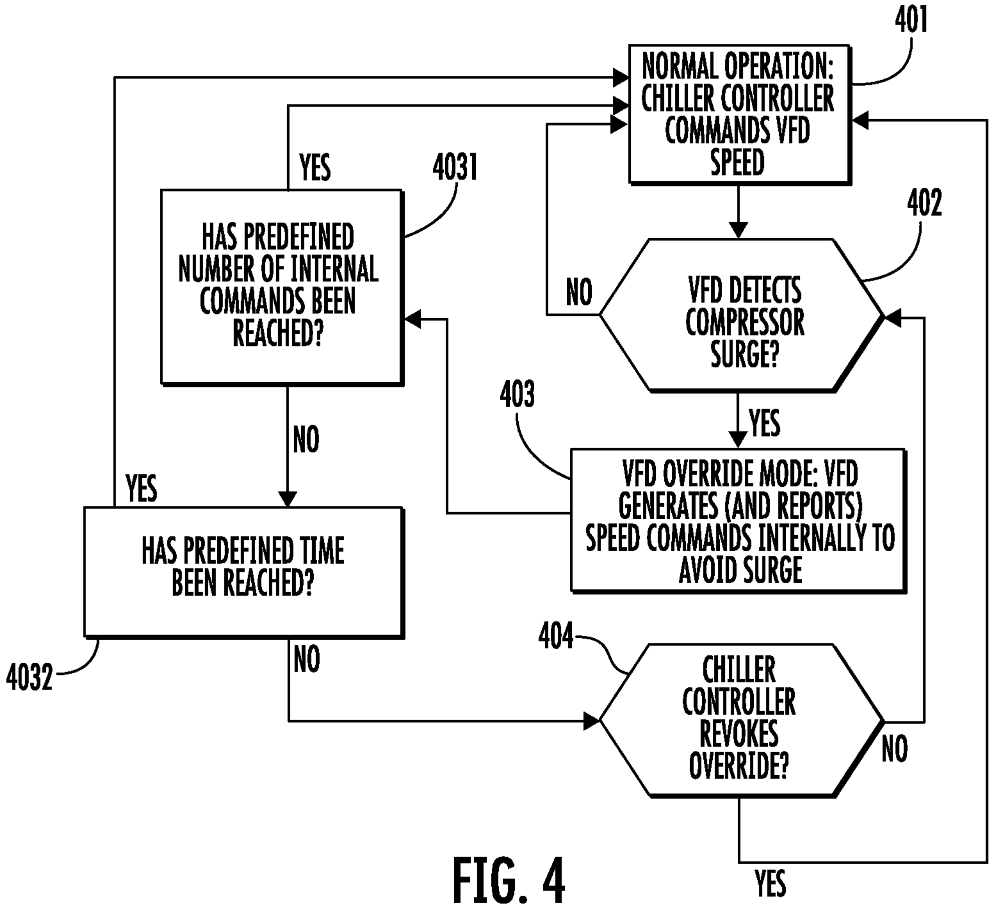
FIG. 4 is a flow diagram illustrating an exemplary operation of the chiller control scheme of FIG. 2 in accordance with further embodiments.

With reference to FIG. 4, the operations described above are illustrated. Initially, during normal operations, the chiller controller 220 commands VFD 210 speed (block 401). At a certain point, the VFD 210 detects a compressor surge condition (block 402) or control reverts back to block 401. Since the VFD 210 detection capability is at the second sampling rate, which is substantially faster than the first sampling rate of the chiller controller 220, the detection by the VFD 210 can be significantly earlier relative to a beginning of the compressor surge condition than any detection by the chiller controller 220. Subsequently, the VFD 210 initiates the override mode accordingly (block 403), during which the VFD 210 generates an internal command to drive the compressor motor 201 at one of the variable frequencies based on the chiller condition at the second sampling rate and thus drives the compressor motor 201 at the one of the variable frequencies responsive to the internal command.

The VFD 210 can then give up control after a predefined number of internal commands are sent (e.g., 2 or 3 internal commands, programmable), in some cases (block 4031). To this end, the VFD 210 can include an override counter 2101 (see FIG. 2) to count a number of the internal commands that are sent. Additionally or alternatively, the VFD 210 can give up control after a predefined time (e.g., 15-30 minutes, programmable), in some cases (block 4032). To this end, the VFD 210 can include a timer 2102 (see FIG. 2) to count a time during which the VFD 210 maintains the override mode.

In addition, the VFD 210 reports or alerts the chiller controller 220 as to the override mode being in effect. The chiller controller 220 subsequently has the option to revoke the override mode whereupon control reverts to block 401 or to refuse to revoke the override mode whereupon control reverts to block 402 (block 404). The chiller controller 220 can also adjust operating conditions at this point away from the chiller condition/surge.

With the configurations and various options described above, the chiller control scheme 200 can react to chiller conditions, especially chiller surge conditions, much faster than what would be possible otherwise. In this way, since the risk of surge is effectively reduced, the chiller control scheme 200 can operate much closer to the compressor surge line then conventional control schemes are capable of and the chiller control scheme 200. Therefore, since operations near the compressor surge line tend to have higher efficiency characteristics, the chiller control scheme 200 can operate at significantly higher efficiency.

Figure 5:
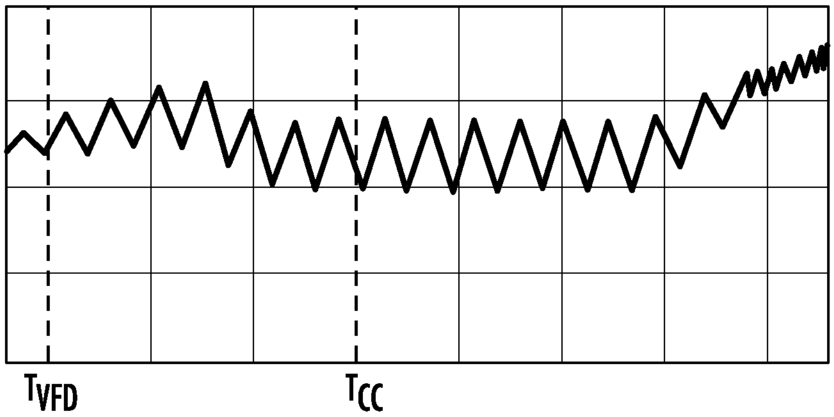
FIG. 5 is a graphical display illustrating the faster response capability of the chiller control scheme of FIG. 2 as compared to a conventional control scheme in accordance with embodiments.
Figure 6:
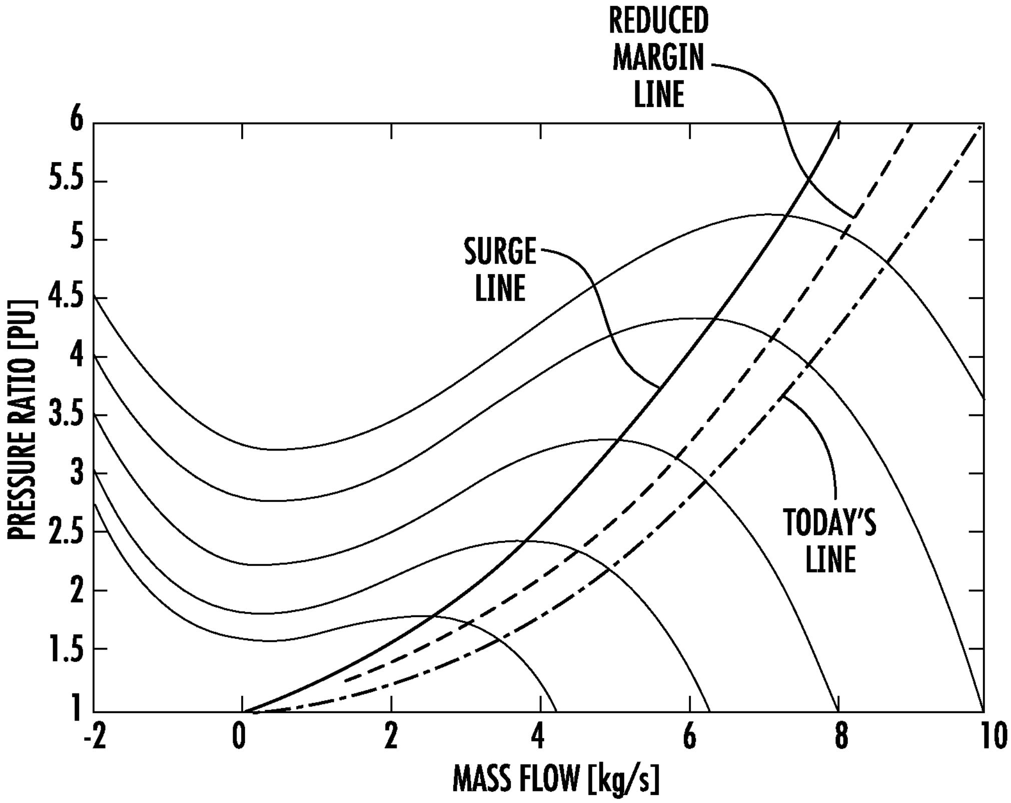
FIG. 6 is a graphical display illustrating the capability of the chiller control scheme of FIG. 2 to operate closer to the surge line and thus at higher efficiencies as compared to a conventional control scheme in accordance with embodiments.

These above noted advantages are illustrated graphically in FIGS. 5 and 6. FIG. 5 shows a readout of a chiller condition which is indicative of a surge. This readout would be effectively available to both the chiller controller 220 and the VFD 210 in their respective monitoring postures. Because the chiller controller 220 monitoring occurs at the first sampling rate of about ~1 Hz, the chiller controller 220 might not begin to react to the chiller condition/surge until at least time $T_{CC}$. By contrast, because the VFD 210 monitoring occurs at the second sampling rate of about ~1 to ~10 kHz, the VFD 210 begins to react to the chiller condition/surge nearly immediately at time $T_{VFD}$. Thus, as shown in FIG. 6, the chiller control scheme 200 permits higher efficiency operations along the "Reduced margin line," which is much closer to the "Surge line" than "Today's line" (i.e., the conventional scheme).

Figure 7:
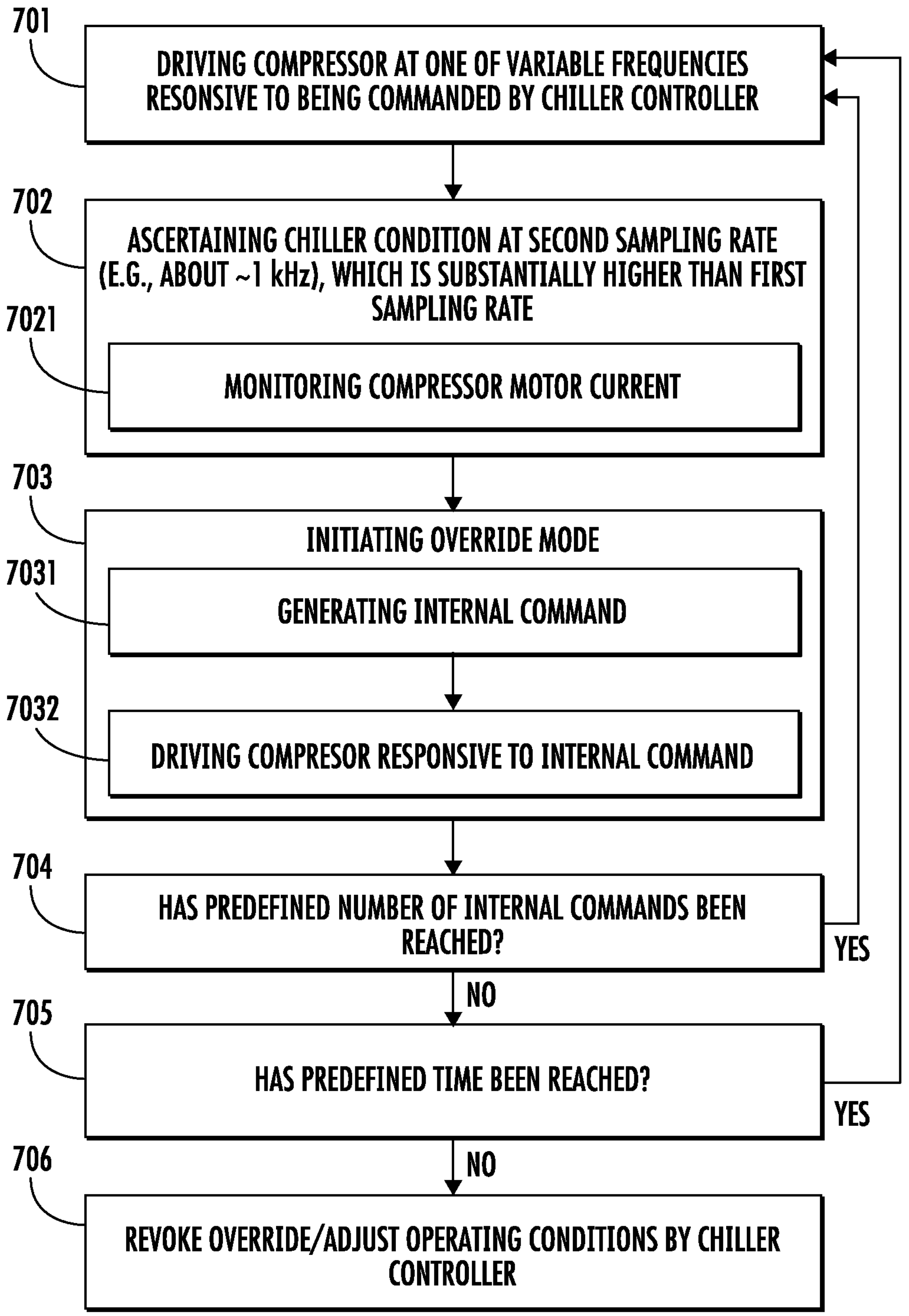
FIG. 7 is a flow diagram illustrating an exemplary method of operating a variable frequency drive (VFD) of a chiller system in accordance with embodiments.

With reference to FIG. 7, a method of operating a VFD of a chiller system as described above in which a chiller controller ascertains a chiller condition and commands the VFD to drive a compressor at one of variable frequencies based on the chiller condition at a first sampling rate (e.g., about ~1 Hz). As show in FIG. 7, the method, which is generally executable by the VFD except for block 704 to be described below, includes driving the compressor at the one of the variable frequencies responsive to being commanded by the chiller controller (block 701), ascertaining the chiller condition at a second sampling rate (e.g., between about ~1 to ~10 kHz), which is substantially higher than the first sampling rate (block 702) by monitoring compressor motor current (block 7021) and initiating an override mode accordingly and alerting the chiller controller as to the override mode being initiated (block 703). As noted above, the chiller condition can be a surge or can be otherwise indicative of a surge. During the override mode of block 703, the VFD generates an internal command to drive the compressor at one of the variable frequencies based on the chiller condition (i.e., to drive a compressor motor of the compressor at an increased speed to counteract the surge condition) at the second sampling rate (block 7031) and drives the compressor at the one of the variable frequencies responsive to the internal command (block 7032).

The VFD can then give up control after a predefined number of internal commands are sent (e.g., 2 or 3 internal commands, programmable), in some cases (block 704). To this end, the VFD can include the override counter (see FIG. 2) to count a number of the internal commands that are sent. Additionally or alternatively, the VFD can give up control after a predefined time (e.g., 15-30 minutes, programmable), in some cases (block 705). To this end, the VFD can include a timer (see FIG. 2) to count a time during which the VFD maintains the override mode.

The chiller controller can then revoke the override mode or adjust operating conditions to counteract the chiller condition/surge (block 706).

Technical effects and benefits of the present disclosure are the provision of an air conditioning system with VFD-based surge detection and response. This allows for chiller control to be better at avoiding inadvertent compressor surge conditions while operating and further allows the chiller controller to target higher efficiency operating points, nearer to the surge point and to rely on the VFD to perform a quick response to avoid surge. The chiller control can also use this VFD surge detection to perform more accurate measurements of surge curves in the chiller.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A chiller system, comprising:

a compressor;

a variable frequency drive (VFD) to drive the compressor at variable frequencies; and a chiller controller to ascertain a chiller condition and to command the VFD to drive the compressor at one of the variable frequencies based on the chiller condition at a first sampling rate, the VFD being configured to drive the compressor at the one of the variable frequencies responsive to being commanded by the chiller controller, to ascertain the chiller condition at a second sampling rate, which is substantially higher than the first sampling rate, and to alert the chiller controller accordingly, wherein the VFD is further configured to initiate an override mode during which the VFD generates an internal command to drive the compressor at one of the variable frequencies based on the chiller condition at the second sampling rate and drives the compressor at the one of the variable frequencies responsive to the internal command and to give up control by the VFD following a predefined number of internal commands being reached or a predefined time being reached.

2. The chiller system according to claim 1, wherein the first sampling rate is about ~1 Hz and the second sampling rate is about ~1 to ~10 KHz.

3. The chiller system according to claim 1, further comprising a compressor motor of the compressor and mechanical components separate and distinct from the compressor motor, wherein the chiller controller is disposed in signal communication with the VFD and the mechanical components at the first sampling rate and is configured to ascertain the chiller condition from communications with the mechanical components.

4. The chiller system according to claim 1, wherein the VFD is configured to ascertain the chiller condition by monitoring compressor motor current at the second sampling rate.

5. A chiller system, comprising:

a compressor;

a variable frequency drive (VFD) to drive the compressor at variable frequencies; and a chiller controller to ascertain a chiller condition and to command the VFD to drive the compressor at one of the variable frequencies based on the chiller condition at a first sampling rate, the VFD being configured to drive the compressor at the one of the variable frequencies responsive to being commanded by the chiller controller, to ascertain the chiller condition at a second sampling rate, which is substantially higher than the first sampling rate, and to alert the chiller controller accordingly, wherein the chiller controller commands the VFD to drive a motor of the compressor at one of the variable frequencies to counteract the chiller condition responsive to being alerted by the VFD.

6. The chiller system according to claim 5, wherein the chiller condition is indicative of a surge condition and the chiller controller commands the VFD to drive the motor of the compressor at an increased speed to counteract the surge condition.

7. A chiller system, comprising:

a compressor;

a variable frequency drive (VFD) to drive the compressor at variable frequencies; and a chiller controller to ascertain a chiller condition and to command the VFD to drive the compressor at one of the variable frequencies based on the chiller condition at a first sampling rate, the VFD being configured to drive the compressor at the one of the variable frequencies responsive to being commanded by the chiller controller, to ascertain the chiller condition at a second sampling rate, which is substantially higher than the first sampling rate, and to initiate an override mode accordingly during which the VFD generates an internal command to drive the compressor at one of the variable frequencies based on the chiller condition at the second sampling rate and drives the compressor at the one of the variable frequencies responsive to the internal command.

8. The chiller system according to claim 7, wherein the first sampling rate is about ~1 Hz and the second sampling rate is about ~1 to ~10 kHz.

9. The chiller system according to claim 7, further comprising a compressor motor of the compressor and mechanical components separate and distinct from the compressor motor, wherein the chiller controller is disposed in signal communication with the VFD and the mechanical components at the first sampling rate and is configured to ascertain the chiller condition from communications with the mechanical components.

10. The chiller system according to claim 7, wherein the VFD is configured to ascertain the chiller condition by monitoring compressor motor current at the second sampling rate.

11. The chiller system according to claim 7, wherein the internal command commands the VFD to drive a motor of the compressor at one of the variable frequencies to counteract the chiller condition.

12. The chiller system according to claim 11, wherein the chiller condition is indicative of a surge condition and the internal command commands the VFD to drive the motor of the compressor at an increased speed to counteract the surge condition.

13. The chiller system according to claim 7, wherein the VFD alerts the chiller controller as to the override mode being initiated and the chiller controller is configured to revoke the override mode.

14. The chiller system according to claim 7, wherein the VFD alerts the chiller controller as to the override mode being initiated and the chiller controller is configured to adjust operating conditions to counteract the chiller condition.

15. A method of operating a variable frequency drive (VFD) of a chiller system in which a chiller controller ascertains a chiller condition and commands the VFD to drive a compressor at one of variable frequencies based on the chiller condition at a first sampling rate, the method being executable by the VFD and comprising:

driving the compressor at the one of the variable frequencies responsive to being commanded by the chiller controller;

ascertaining the chiller condition at a second sampling rate, which is substantially higher than the first sampling rate; and initiating an override mode accordingly during which the VFD generates an internal command to drive the compressor at one of the variable frequencies based on the chiller condition at the second sampling rate and drives the compressor at the one of the variable frequencies responsive to the internal command.

16. The method according to claim 15, wherein the first sampling rate is about ~1 Hz and the second sampling rate is about ~1 to ~10 kHz.

17. The method according to claim 15, wherein the ascertaining of the chiller condition comprises monitoring compressor motor current at the second sampling rate.

18. The method according to claim 15, wherein the chiller condition is indicative of a surge condition and the internal command commands the VFD to drive a motor of the compressor at an increased speed to counteract the surge condition.

19. The method according to claim 15, wherein the VFD alerts the chiller controller as to the override mode being initiated and the chiller controller is configured to revoke the override mode.

20. The method according to claim 15, wherein the VFD alerts the chiller controller as to the override mode being initiated and the chiller controller is configured to adjust operating conditions to counteract the chiller condition.

* * * * *